(12) United States Patent
Shei et al.

(10) Patent No.: US 9,693,655 B2
(45) Date of Patent: Jul. 4, 2017

(54) PAN STORAGE APPARATUS

(71) Applicant: DUKE MANUFACTURING CO., St. Louis, MO (US)

(72) Inventors: Steven Shei, Fort Wayne, IN (US); Ralph Macy, St. Peters, MO (US); Douglas M. Lewis, St. Charles, MO (US)

(73) Assignee: Duke Manufacturing Co., St. Louis, MO (US)

( * ) Notice: Subject to any disclaimer, the term of this patent is extended or adjusted under 35 U.S.C. 154(b) by 0 days.

(21) Appl. No.: 14/855,924

(22) Filed: Sep. 16, 2015

(65) Prior Publication Data
US 2016/0073821 A1 Mar. 17, 2016

Related U.S. Application Data

(60) Provisional application No. 62/051,479, filed on Sep. 17, 2014.

(51) Int. Cl.
A47F 7/00 (2006.01)
A47F 3/14 (2006.01)
(Continued)

(52) U.S. Cl.
CPC ............. *A47J 36/34* (2013.01); *A47J 36/12* (2013.01); *A47J 37/0623* (2013.01);
(Continued)

(58) Field of Classification Search
CPC ........ A47J 36/34; A47J 36/12; A47J 37/0623; A47J 37/0664; A47J 39/00; A47J 39/006; A47B 2210/0059; A47B 2210/0002; A47B 88/00; A47B 88/04; A47B 2210/0018; F24C 7/043; F24C 11/00; F24C 15/30; F24C 15/16; F24C 15/18
USPC ........... 211/126.15, 13.1, 153; 219/394, 402, 219/386, 392, 395, 428, 483; 99/483, 99/485; 312/330.1, 236, 334.7, 334.1, 312/334.23, 334.44; 126/333, 337 R, 126/339, 332; 426/418
See application file for complete search history.

(56) References Cited

U.S. PATENT DOCUMENTS 4,771,907 A * 9/1988 Torney .................. A45C 11/20
220/23.83
D308,497 S 6/1990 Roche
(Continued)

FOREIGN PATENT DOCUMENTS

CA 700459 A 12/1964
GB 616570 A 1/1949
(Continued)

OTHER PUBLICATIONS

Allpoints Pan Cover (Ccc Item Sp-338) Replaces Prince Castle: 5-18-1548, 2 pgs, admitted prior art.
(Continued)

*Primary Examiner* — Jennifer E Novosad
(74) *Attorney, Agent, or Firm* — Senniger Powers LLP

(57) ABSTRACT

Pan support apparatus and associated methods. A pan is removably receivable in at least one pan storage space of the pan storage apparatus. A cover is supported in the pan storage space for covering an open top of the pan. The cover is removably supported in the pan storage space.

15 Claims, 16 Drawing Sheets

(51) Int. Cl.

| | | |
|---|---|---|
| *A47J 47/00* | (2006.01) | |
| *A47B 88/00* | (2017.01) | |
| *F24C 15/16* | (2006.01) | |
| *F24D 11/00* | (2006.01) | |
| *A47J 36/34* | (2006.01) | |
| *A47J 36/12* | (2006.01) | |
| *A47J 39/00* | (2006.01) | |
| *A47J 37/06* | (2006.01) | |
| *F24C 15/18* | (2006.01) | |

(52) U.S. Cl.
CPC ............. *A47J 39/006* (2013.01); *F24C 15/16* (2013.01); *F24C 15/18* (2013.01)

(56) References Cited

U.S. PATENT DOCUMENTS

| | | | |
|---|---|---|---|
| D320,327 S | 10/1991 | Hollins | |
| D326,795 S | 6/1992 | Reitz | |
| D347,360 S | 5/1994 | Wheeler | |
| 6,116,154 A * | 9/2000 | Vaseloff | A47J 39/02 219/214 |
| 6,175,099 B1 * | 1/2001 | Shei | A47J 39/006 219/385 |
| 6,412,403 B1 * | 7/2002 | Veltrop | A47J 36/2483 219/214 |
| 6,541,739 B2 | 4/2003 | Shei et al. | |
| D526,157 S | 8/2006 | Laib | |
| 7,105,779 B2 * | 9/2006 | Shei | A21B 1/22 219/394 |
| D538,588 S | 3/2007 | Laib et al. | |
| 7,328,654 B2 * | 2/2008 | Shei | A47J 39/006 219/385 |
| 7,385,160 B2 * | 6/2008 | Jones | F24C 15/16 126/333 |
| D581,205 S | 11/2008 | Simon et al. | |
| D584,612 S | 1/2009 | Ianello | |
| D586,623 S | 2/2009 | Dunn | |
| D613,113 S | 4/2010 | Lippert | |
| D619,829 S | 7/2010 | Zalewski | |
| 7,762,636 B2 * | 7/2010 | Veeser | A47B 88/407 219/385 |
| D620,765 S | 8/2010 | Sudia | |
| D620,766 S | 8/2010 | Sudia | |
| D620,942 S | 8/2010 | Huang | |
| 7,858,906 B2 * | 12/2010 | Veltrop | A47J 39/006 219/385 |
| 8,091,472 B2 * | 1/2012 | Maciejewski | A47J 39/00 219/385 |
| 8,096,231 B2 * | 1/2012 | Veltrop | A47J 37/0623 219/385 |
| D664,149 S | 7/2012 | Crisp et al. | |
| D704,511 S | 5/2014 | Beckman | |
| D718,086 S | 11/2014 | Lewis | |
| D719,956 S | 12/2014 | Akana | |
| D728,991 S | 5/2015 | Hasegawa | |
| 9,068,768 B2 * | 6/2015 | Veltrop | F25D 25/028 |
| 2001/0007322 A1 * | 7/2001 | Shei | A47J 39/006 219/399 |
| 2004/0217116 A1 | 11/2004 | Offerman et al. | |
| 2009/0199725 A1 | 8/2009 | Veltrop et al. | |
| 2009/0266244 A1 | 10/2009 | Maciejewski et al. | |
| 2014/0263269 A1 | 9/2014 | Veltrop et al. | |
| 2016/0073821 A1 * | 3/2016 | Shei | A47J 36/12 220/573.1 |

FOREIGN PATENT DOCUMENTS

| | | |
|---|---|---|
| WO | 00/57709 A1 | 10/2000 |
| WO | 2007/047597 A2 | 4/2007 |

OTHER PUBLICATIONS

Photograph of Duke Pan Lid, P/N 155876, admitted prior art, 1 pg.

\* cited by examiner

PAN STORAGE APPARATUS

CROSS-REFERENCE TO RELATED APPLICATION

This application claims priority to U.S. Provisional Patent Application No. 62/051,479, filed Sep. 17, 2014, which is hereby incorporated by reference in its entirety.

FIELD

The present invention generally relates to pan storage and, more particularly, to apparatus and methods for supporting and covering open top pans.

BACKGROUND

Many types of containers have an open top and a lid for covering the open top for storing items therein. For example, some containers having an open top and lid may be used for storing food. It may be desirable to store food in such a container before preparing, serving, and/or consuming the food.

SUMMARY

One aspect of the present invention is directed to apparatus for storing an open top pan. The apparatus includes a pan storage space having a front pan receiving opening sized to permit the pan to be received in the pan storage space from the front pan receiving opening. The apparatus includes at least one slide surface in the pan storage space constructed to slidably receive and support the pan on the at least one slide surface. The apparatus includes a cover for at least partially covering the open top of the pan. The cover has a front end, a rear end, and left and right sides. The pan storage space includes a front cover receiving opening at least partially above the front pan receiving opening. The front cover receiving opening is sized to permit the cover to be received in the pan storage space from the front cover receiving opening. At least one cover support surface is positioned for supporting the cover in the pan storage space when the cover is received in the pan storage space from the front cover receiving opening. The apparatus includes at least one retainer blocking a forward portion of the pan storage space. The at least one retainer includes a cover retaining surface constructed for engaging a retainer engagement surface of the cover to retain the cover in the pan storage space. The cover and the at least one retainer are constructed to permit the retainer engagement surface of the cover to pass over the cover retaining surface as the cover is moved rearward with respect to the retainer into the pan storage space from the front cover receiving opening.

Another aspect of the present invention is directed to a method of manipulating a pan and a cover for the pan. The method includes inserting the cover in a pan storage space from a front cover receiving opening of the pan storage space. The cover is supported in the pan storage space on at least one cover support surface. The method includes inserting the pan in the pan storage space from a front pan receiving opening of the pan storage space. Inserting the cover in the pan storage space includes passing the cover at least partially above a cover retainer in the pan storage space such that a retainer engagement surface of the cover passes rearward over a cover retaining surface of the retainer.

Other objects and features of the present invention will be in part apparent and in part pointed out herein.

BRIEF DESCRIPTION OF THE DRAWINGS

Corresponding reference characters indicate corresponding parts throughout the drawings.

DETAILED DESCRIPTION

Figure 1:
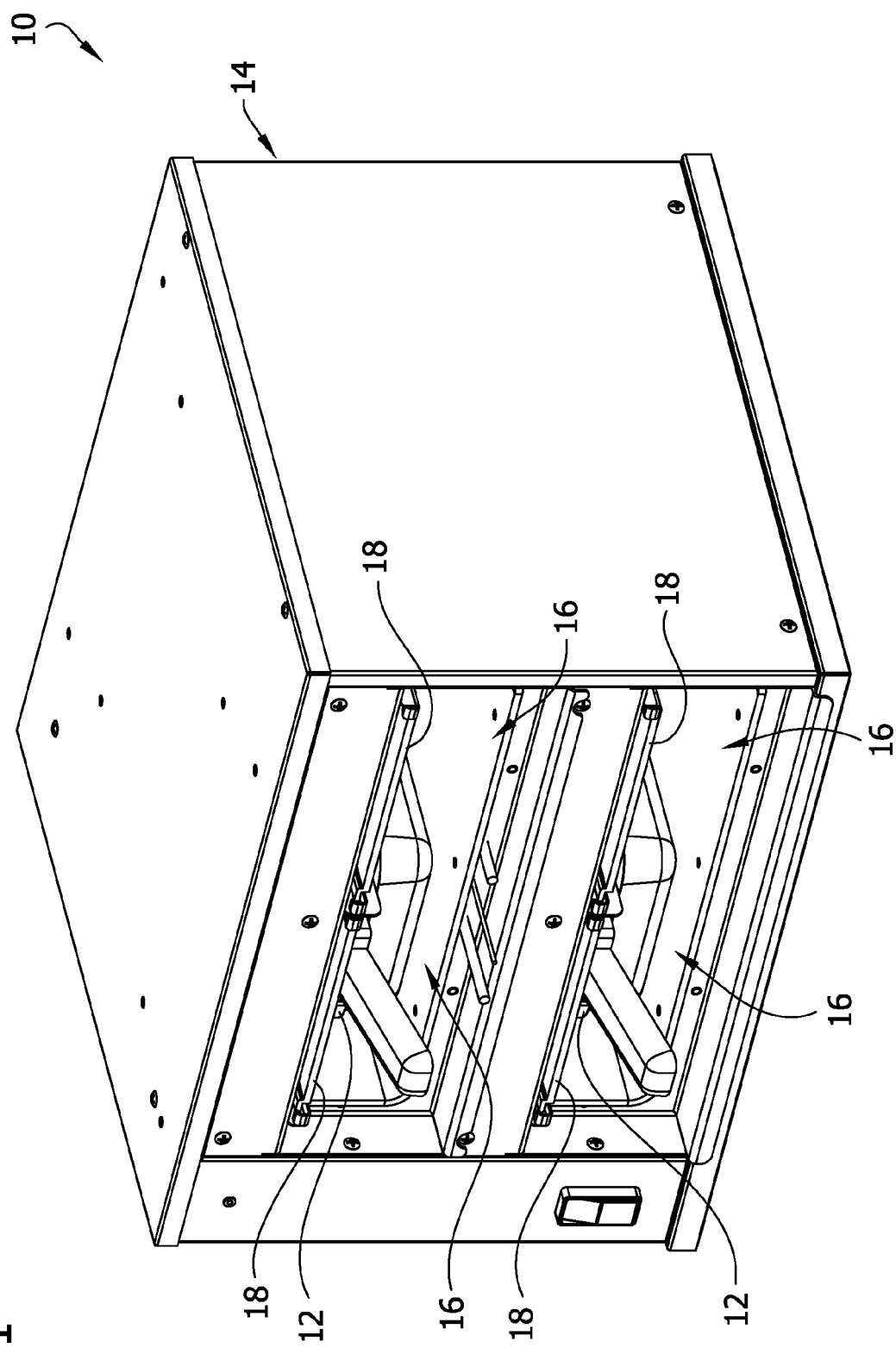
FIG. 1 is a front perspective of a pan storage apparatus embodying aspects of the present invention.
Figure 2:
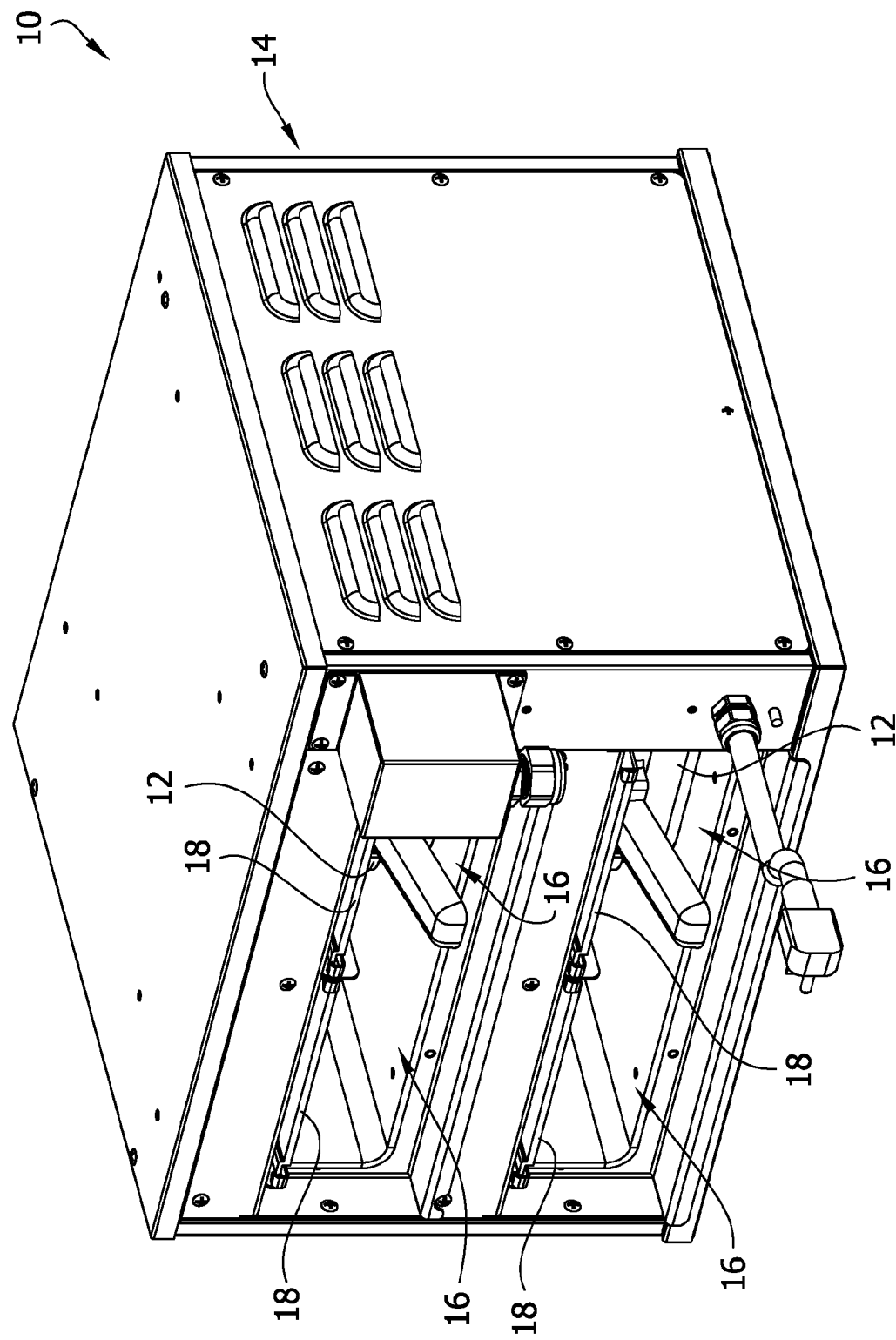
FIG. 2 is a rear perspective of the pan storage apparatus of FIG. 1.
Figure 3:
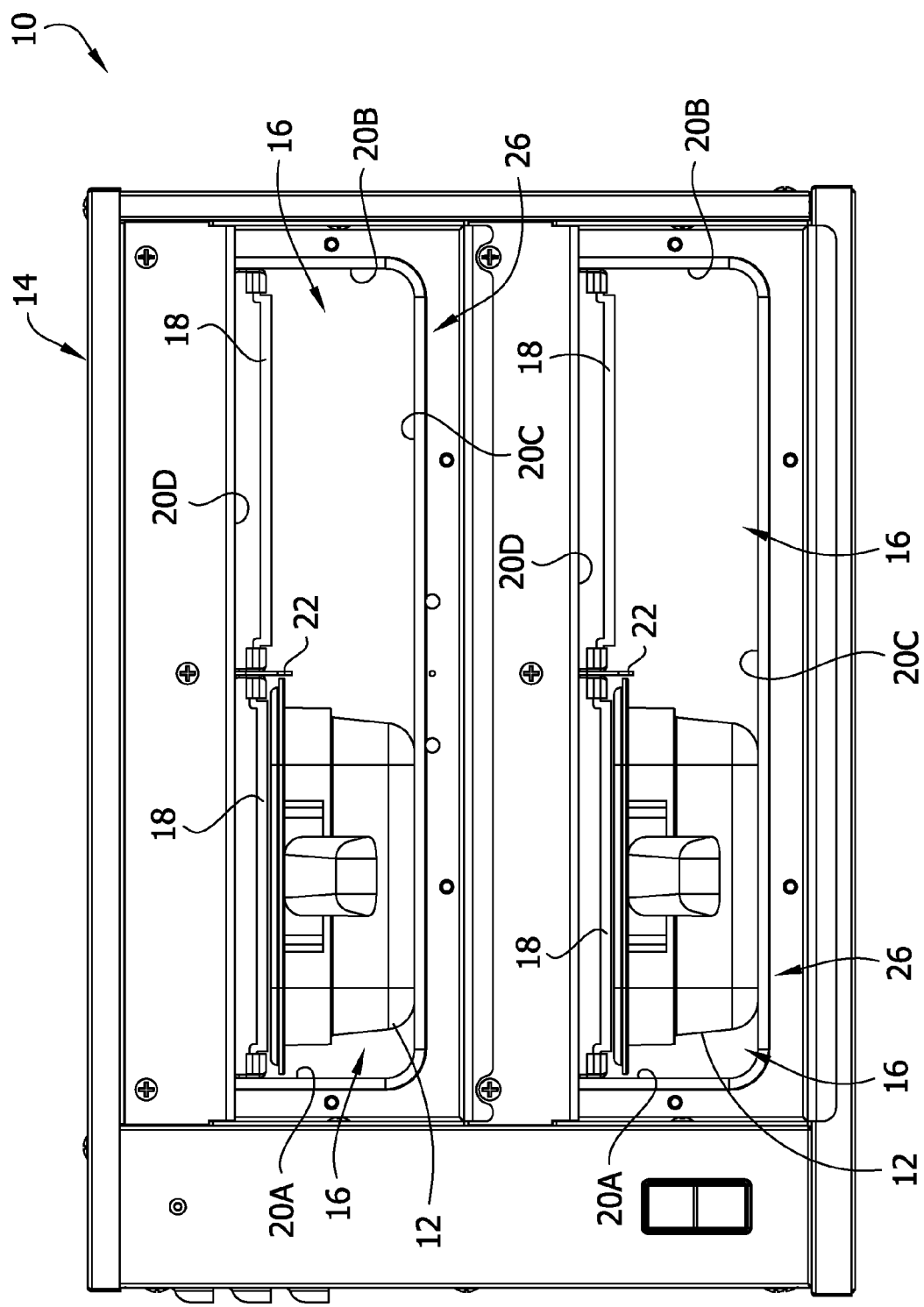
FIG. 3 is a front elevation of the pan storage apparatus.

Referring to the drawings, FIGS. 1-3 illustrate a pan storage apparatus, generally designated by the reference number 10, embodying aspects of the present invention. For example without limitation, the pan storage apparatus 10 may be used in the food service industry for food storage, such as for storing food in one or more pans 12 in an ambient, cool, or warm temperature environment. As will become apparent, contents stored in a pan 12 in the pan storage apparatus 10 can be accessed by pulling the pan forward from a stowed position to expose an open top of the pan and its contents therein, and the pan can be pushed rearward to return the pan to its stowed position, or the pan can be removed from the pan storage apparatus. It will be understood the pan storage apparatus 10 may be used for other purposes without departing from the scope of the present invention.

In the illustrated embodiment, the pan storage apparatus 10 comprises a housing or cabinet 14. The housing 14 includes top, bottom, left, right, front, and rear walls, defining an interior therein. The housing 14 includes an upper compartment and a lower compartment, each including two pan storage spaces 16. Two pans 12 are shown received in respective pan storage spaces 16. As will be explained in further detail below, pan covers 18 are supported in the pan storage spaces 16 for covering pans 12 thereunder. Four pan covers 18 are shown in respective pan storage spaces. Both of the compartments have an open front and an open back permitting pans 12 to be inserted in and accessed from either the front or back of the housing. Other configurations and arrangements (e.g., permitting access from the front only) may be used without departing from the scope of the present invention. Referring to FIG. 3, each compartment includes a left side wall 20A, a right side wall 20B, a bottom wall 20C, and a top wall 20D. The compartments also include a partition 22 that partially partitions the pan storage spaces 16 from each other. It will be understood that compartments bound by more or fewer walls (e.g., only a bottom wall) and having other configurations can be used without departing from the scope of the present invention.

In the illustrated embodiment, the pan storage apparatus 10 is configured for holding food at a warm temperature. As shown in FIG. 3, each compartment includes a heat sink 26 forming the bottom wall 20C and the left and right side walls 20A, 20B of the compartment. The heat sink 26 can be made of a metal material and be heated by any suitable means, such as by a resistance heating element for providing heat to the compartment. Moreover, the compartments include upper infrared heat emitters (not shown) for heating the food from above through the top wall 20D. Other suitable heating means could also be used. Moreover, it will be understood that the food may be held in an ambient or cool temperature environment without departing from the scope of the present invention.

Figure 4:
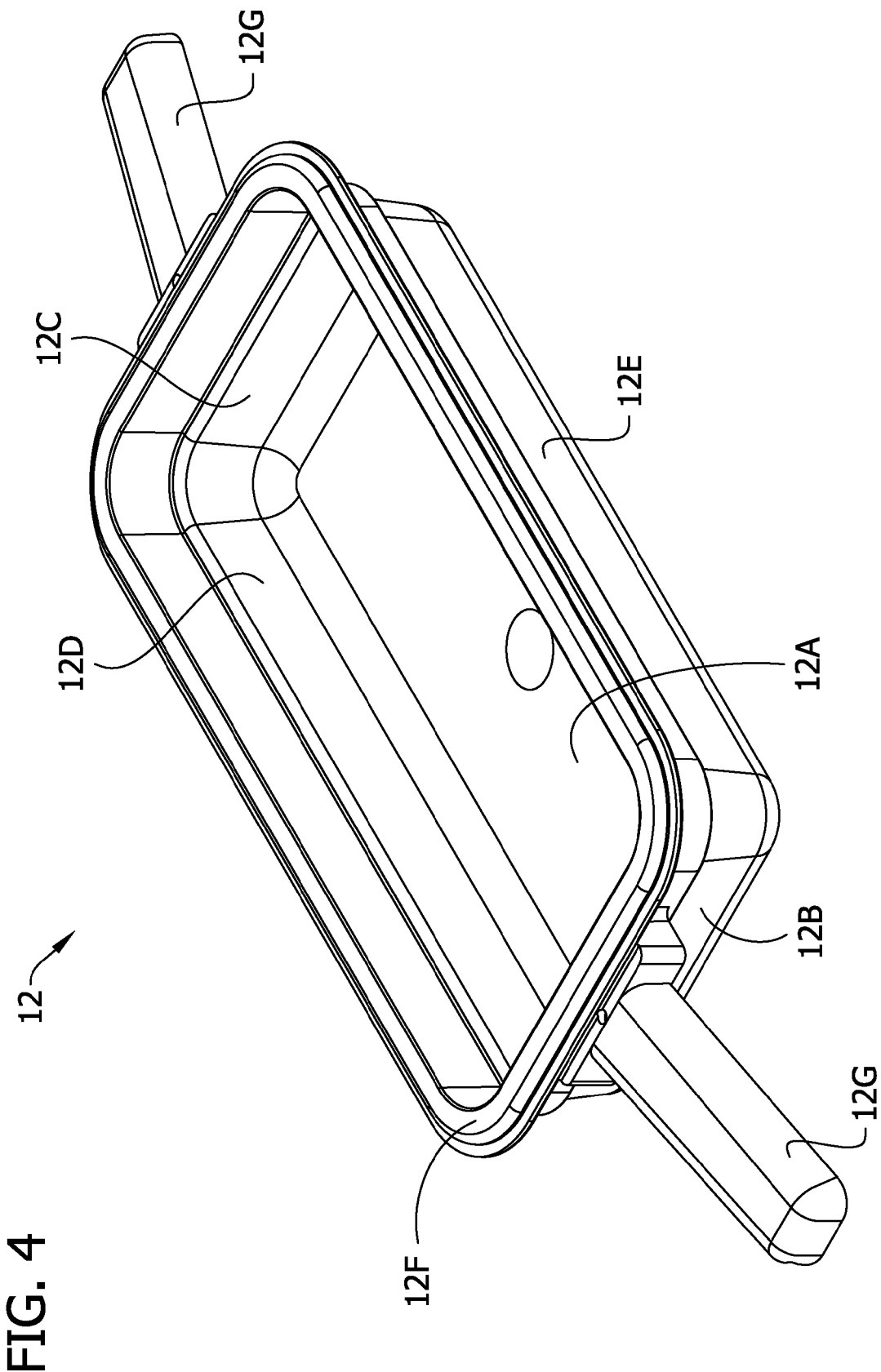
FIG. 4 is a perspective of a pan for use with the pan storage apparatus.

Referring to FIG. 4, one of the pans 12 is shown in closer detail. The pan 12 is generally rectangular and includes a bottom wall 12A, front wall 12B, rear wall 12C, left and right side walls 12D, 12E, defining an interior of the pan, and an open top providing access to the interior. The pan 12 includes a rim 12F extending around the periphery of the pan adjacent the open top. The rim 12F extends outboard of the front, rear, and left and right side walls 12B-12E and includes front, rear, left, and right rim portions corresponding to the respective sides of the pan 12. The pan 12 may be made of any suitable material, such as a type of plastic. Handles 12G are provided at the front and rear of the pan 12. Pans having other configurations may be used without departing from the scope of the present invention.

Figure 5:
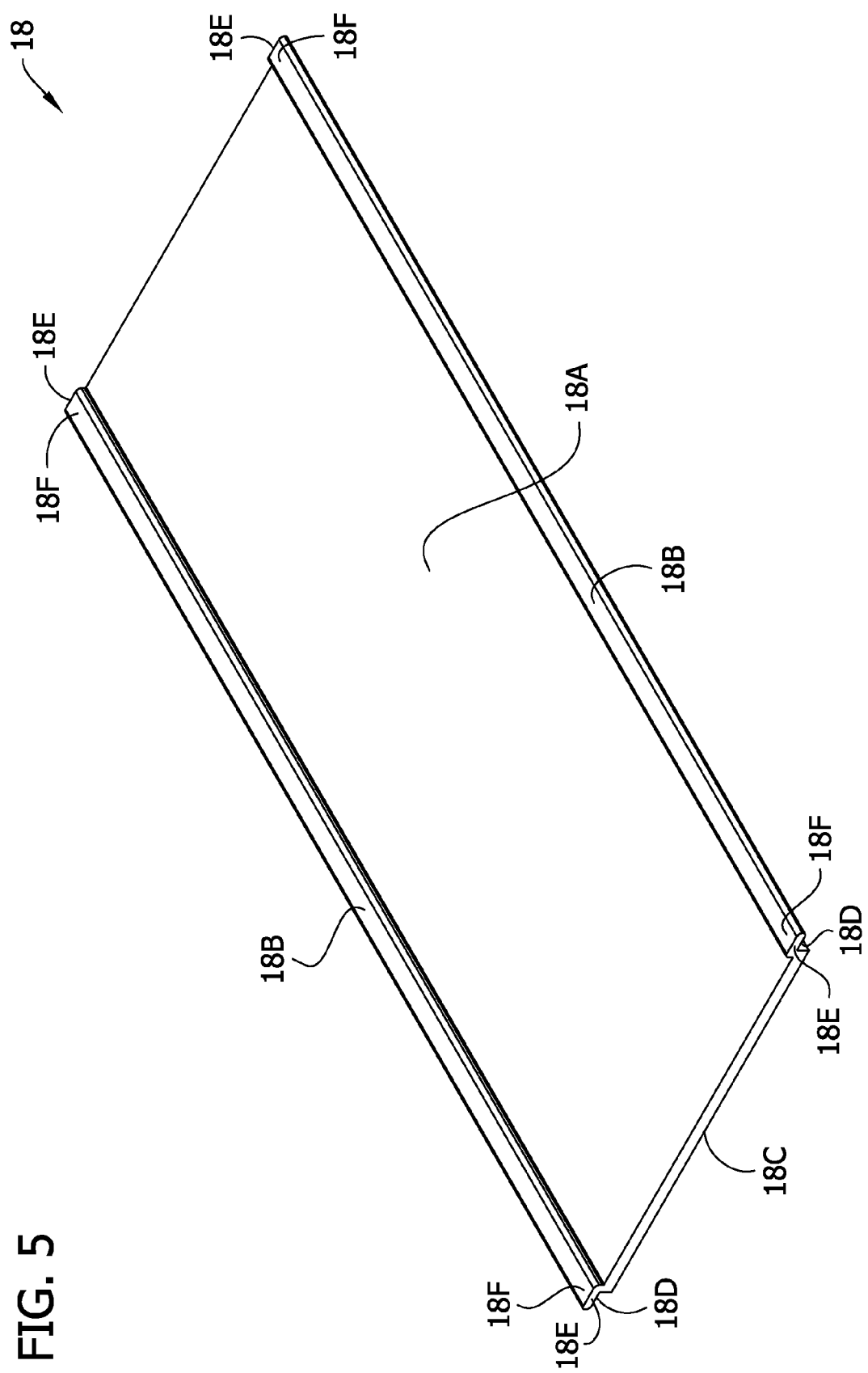
FIG. 5 is a perspective of a pan cover of the pan storage apparatus.
Figure 6:
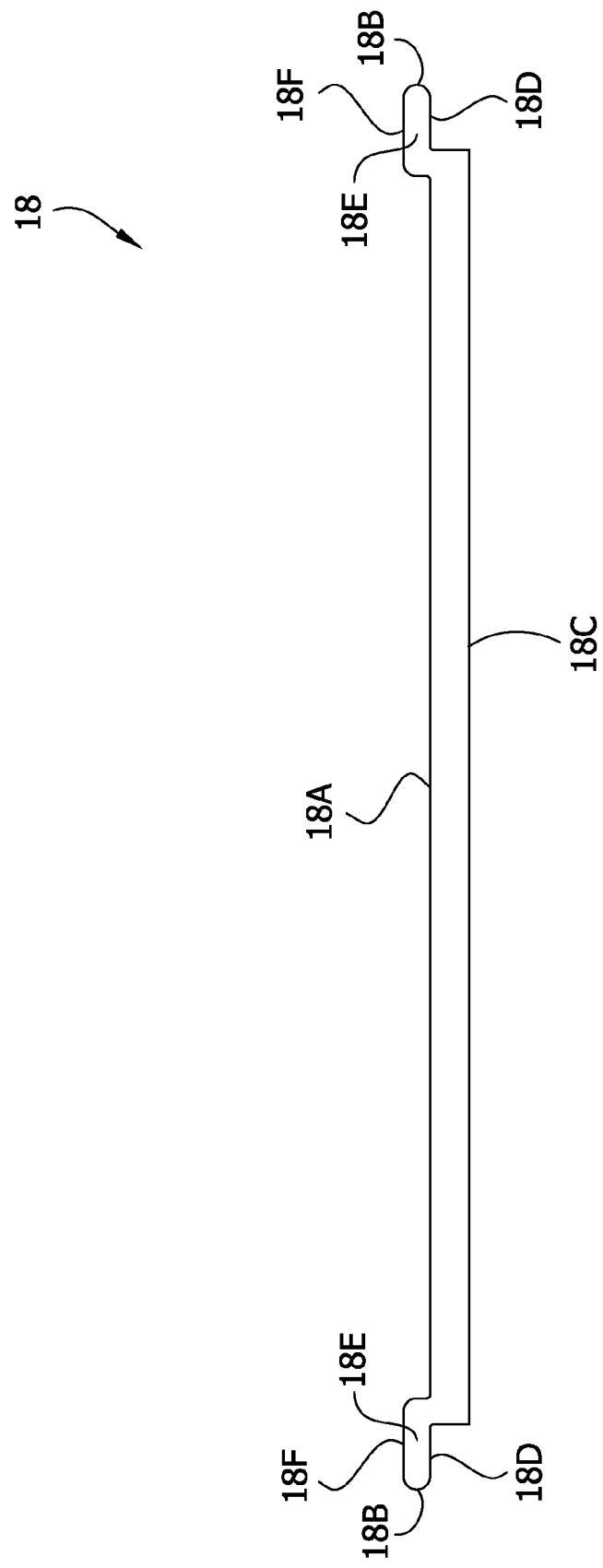
FIG. 6 is a front elevation of the pan cover of FIG. 5.

Referring to FIGS. 5 and 6, one of the covers 18 is shown in closer detail. The cover 18 is generally rectangular and includes a front end, rear end, and left and right sides. The cover 18 includes a generally rectangular main body or pan covering section 18A, and left and right arms 18B. As will become apparent, the cover 18 is selectively receivable in and removable from the pan storage spaces 16. The cover 18 is constructed to permit the pan 12 to be slidably received under the cover in the pan storage space 16 for covering the pan. The cover 18 may be formed of any suitable material, such as aluminum, another type of metal, or a type of plastic.

The pan covering section 18A includes a generally rectangular body having a width and a length desirably both greater than a thickness of the rectangular body. The bottom of the pan covering section 18A includes a generally rectangular pan engagement surface 18C constructed to engage the pan rim 12F around the periphery of the pan rim to substantially seal (e.g., by the force of gravity on the cover 18) around the open top of the pan. In the illustrated embodiment, the bottom of the pan covering section 18A is substantially planar. Other configurations may be used without departing from the scope of the present invention. For example, the cover 18 may not be constructed to engage the pan 12 and/or may be constructed to permit venting from the open top of the pan. It will be appreciated that the cover can at least partially cover the open top of the pan without engaging the pan or engaging only part of the pan rim for permitting the interior of the pan to vent out of the open top.

The cover arms 18B extend laterally from the left and right sides of the pan covering section 18A. The arms 18B extend between the front and back ends of the pan covering section 18A, and the arms are offset above the pan covering section. Each arm 18B includes a support engagement surface 18D on a bottom side of the arm. The support engagement surfaces 18D face downward and extend between the front and rear ends of the cover 18 on respective left and right sides of the pan covering section 18A. The pan covering section 18A is positioned between the left and right support engagement surfaces 18D, and the pan engagement surface 18C of the pan covering section 18A is offset below the left and right support engagement surfaces. The purpose and function of the support engagement surfaces 18D will become apparent. Moreover, the arms 18B include retainer engagement surfaces 18E on front and rear ends of the arms. The retainer engagement surfaces 18E on the front end of the cover 18 face forward, and the retainer engagement surfaces 18E on the rear end face rearward. The arms 18B also include upward facing keeper engagement surfaces 18F adjacent the front and rear ends of the arms, above the retainer engagement surfaces 18E and the support engagement surfaces 18D. The purpose and function of the retainer engagement surfaces 18E and keeper engagement surfaces 18F will become apparent. Other types and configurations of covers may be used without departing from the scope of the present invention. For example, the cover may be substantially planar (e.g., not have offset arms). In such a configuration, the cover may still include left and right support engagement surfaces, but they may not be offset with respect to the pan engagement surface of the pan covering section.

Figure 7:
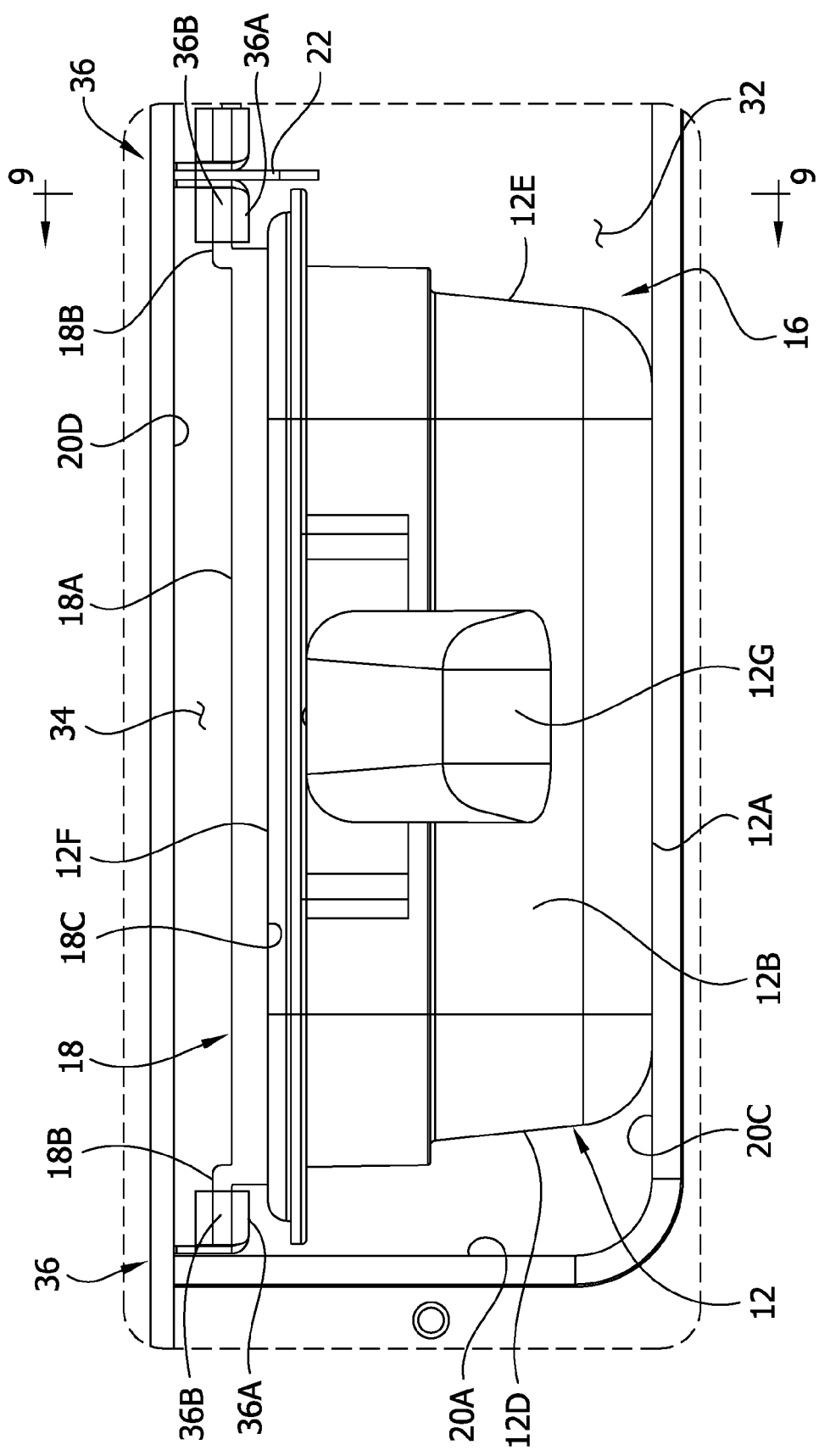
FIG. 7 is a front elevation of a portion of the pan storage apparatus showing a pan received in a pan storage space under a pan cover.
Figure 8:
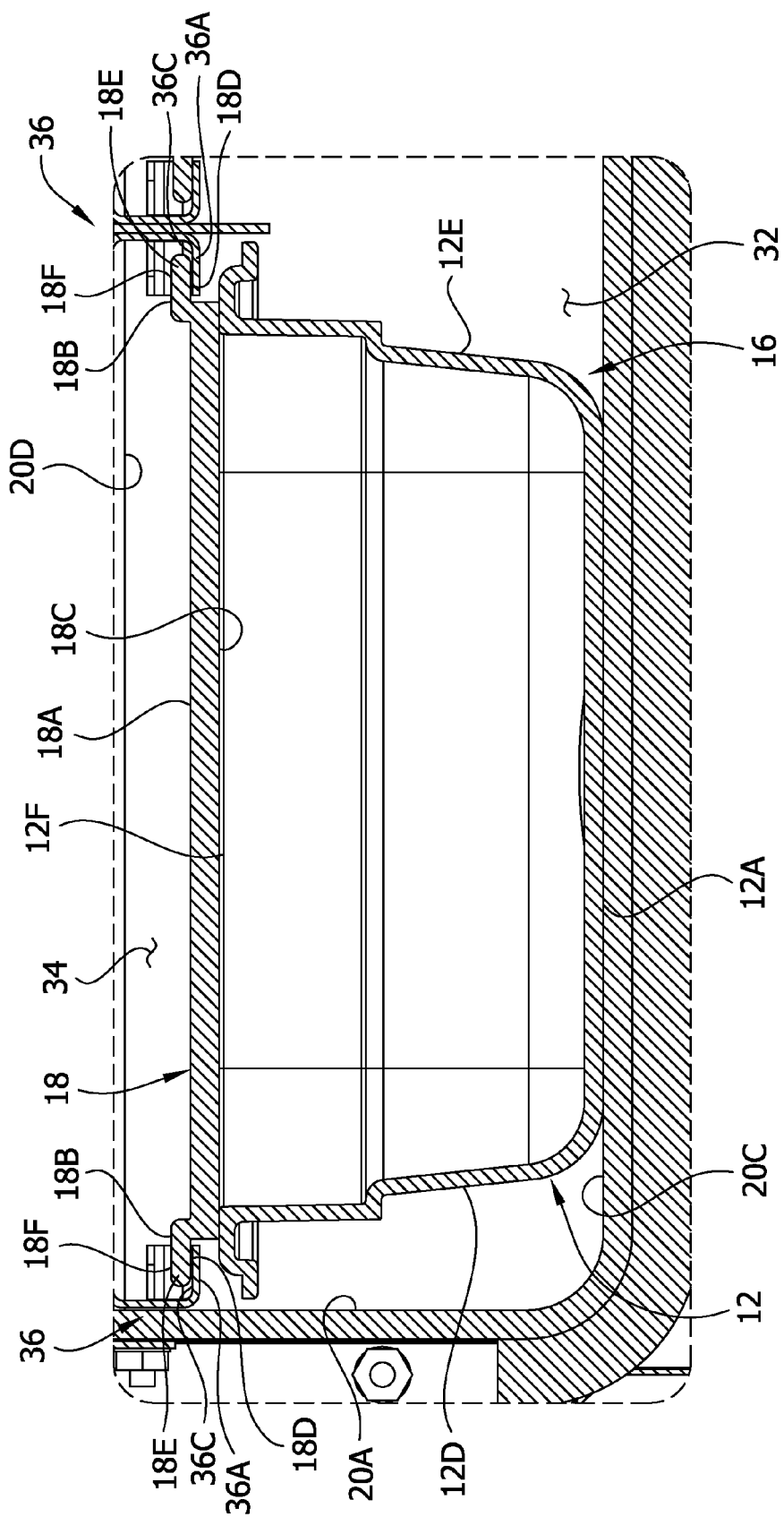
FIG. 8 is a section taken widthwise of the portion of the pan storage apparatus and pan of FIG. 7.
Figure 9:
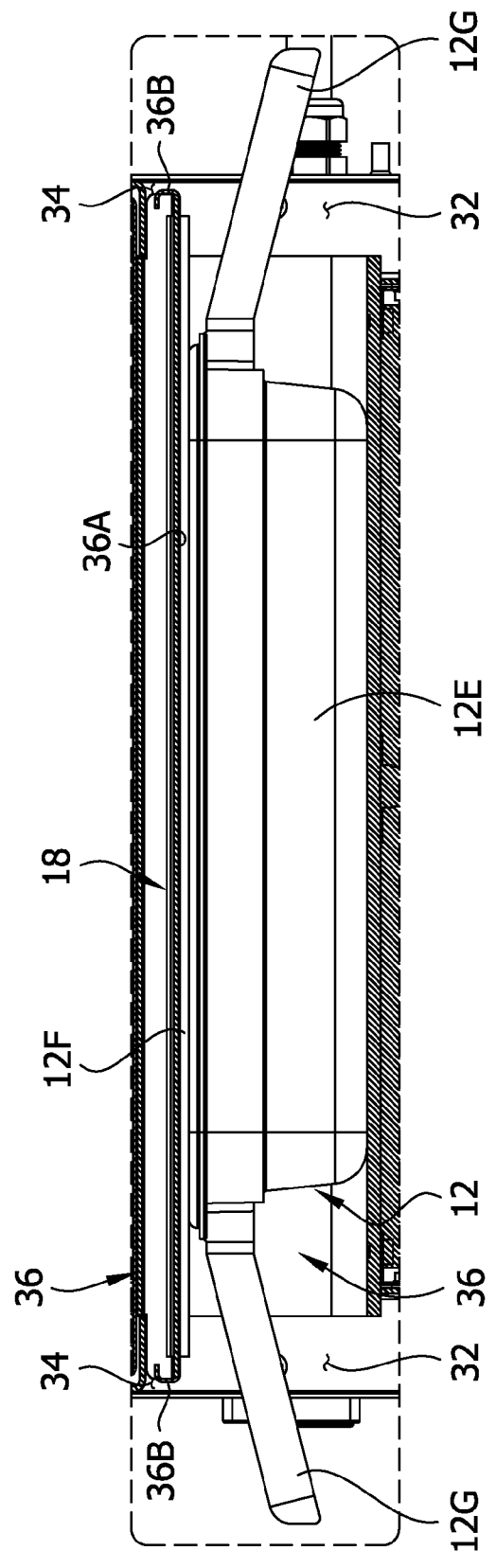
FIG. 9 is a section taken lengthwise of the portion of the pan storage apparatus and pan of FIG. 7.

One of the pan storage spaces 16 having a pan 12 and cover 18 therein is shown in closer detail in FIG. 7, which is a front elevation of the pan storage space, in FIG. 8, which is a section of the pan storage space taken along the width of the pan storage space, and in FIG. 9, which is a section of the pan storage space taken along the length of the pan storage space (as indicated in FIG. 7). The pan storage space 16 includes a top wall defined by the top wall 20D of the compartment, a bottom wall defined by the bottom wall 20C of the compartment, a left wall defined by the left wall 20A of the compartment, and a right wall defined by the partition 22. It will be understood that pan storage spaces bound by more or fewer walls (e.g., only a bottom wall) or having other configurations can be used without departing from the scope of the present invention.

The pan storage space 16 includes a front opening and a rear opening permitting the pan 12 and cover 18 to be inserted in the pan storage space from the front and the back of the pan storage space. The front opening will be described in further detail, with the understanding that the rear opening has essentially the same configuration. The front opening includes a pan receiving opening 32 sized to permit the pan to be received in the pan storage space 16 from the front of the pan storage space through the pan receiving opening. The bottom wall 20C of the pan storage space 16 defines a slide surface constructed to slidably receive and support the bottom of the pan 12 on the slide surface in the pan storage space. As the pan 12 is inserted in the pan storage space 16 from the pan receiving opening 32, the pan can be slid along the slide surface 20C and rest in the pan storage space on the slide surface. Desirably, the pan receiving opening 32 has a width and a height generally corresponding to or greater than a width and a height of the pan 12, and the slide surface 20C has a width and a length at least as great as the width and length of the bottom of the pan. Other pan receiving openings and slide surfaces and dimensions can be used without departing from the scope of the present invention. For example, the slide surface may comprise two slide surfaces configured to slidably receive and support the rim of the pan.

The front opening of the pan storage space 16 also includes a cover receiving opening 34 located above the pan receiving opening 32. In the illustrated embodiment, the cover receiving opening 34 and pan receiving opening 32 are non-overlapping sections of the front opening. The cover receiving opening 34 is sized to permit the cover 18 to be received in the pan storage space 16 from the front of the pan storage space through the front cover receiving opening 34. Desirably, the cover receiving opening 34 has a width and a height generally corresponding to or greater than a width and height of the cover 18.

Other configurations of pan and cover receiving openings 32, 34 can be used without departing from the scope of the present invention. For example, the pan and cover receiving openings can be separated (e.g., by a horizontal partition or bar). Moreover, the pan and cover receiving openings can at least partially overlap each other without departing from the scope of the present invention. For example, the cover receiving opening may overlap an upper portion of the pan receiving opening.

Referring to FIGS. 7-9, cover support structure is provided inside the pan storage space 16 for supporting the cover 18 in the pan storage space 16. The cover support structure includes left and right cover holders 36 adjacent respective left and right sides of the pan storage space 16. The cover holders 36 each include a cover support 36A in the form of a rail extending between the front and rear ends of the pan storage space 16, and the cover holders each include front and rear cover retainers 36B adjacent the front and rear ends of the pan storage space at the front and rear ends of the cover supports 36A. The cover supports 36A include respective upward facing elongate cover support surfaces 36C that extend between the front and rear of the pan storage space 16 adjacent the left and right sides of the pan storage space. The cover support surfaces 36C are positioned for supporting the cover 18 in the pan storage space 16 when the cover is received in the pan storage space from the front cover receiving opening 34. When the cover 18 is received in the pan storage space 16, and the pan 12 is not received in the pan storage space, the support engagement surfaces 18D of the cover 18 rest on the cover support surfaces 36C of the cover supports 36A for supporting the cover in a position elevated above the slide surface 20C. As described in further detail below, when the pan 12 is received in the pan storage space 16, the pan supports the cover 18 such that the support engagement surfaces 18D are spaced above the cover support surfaces 36C.

Figure 11:
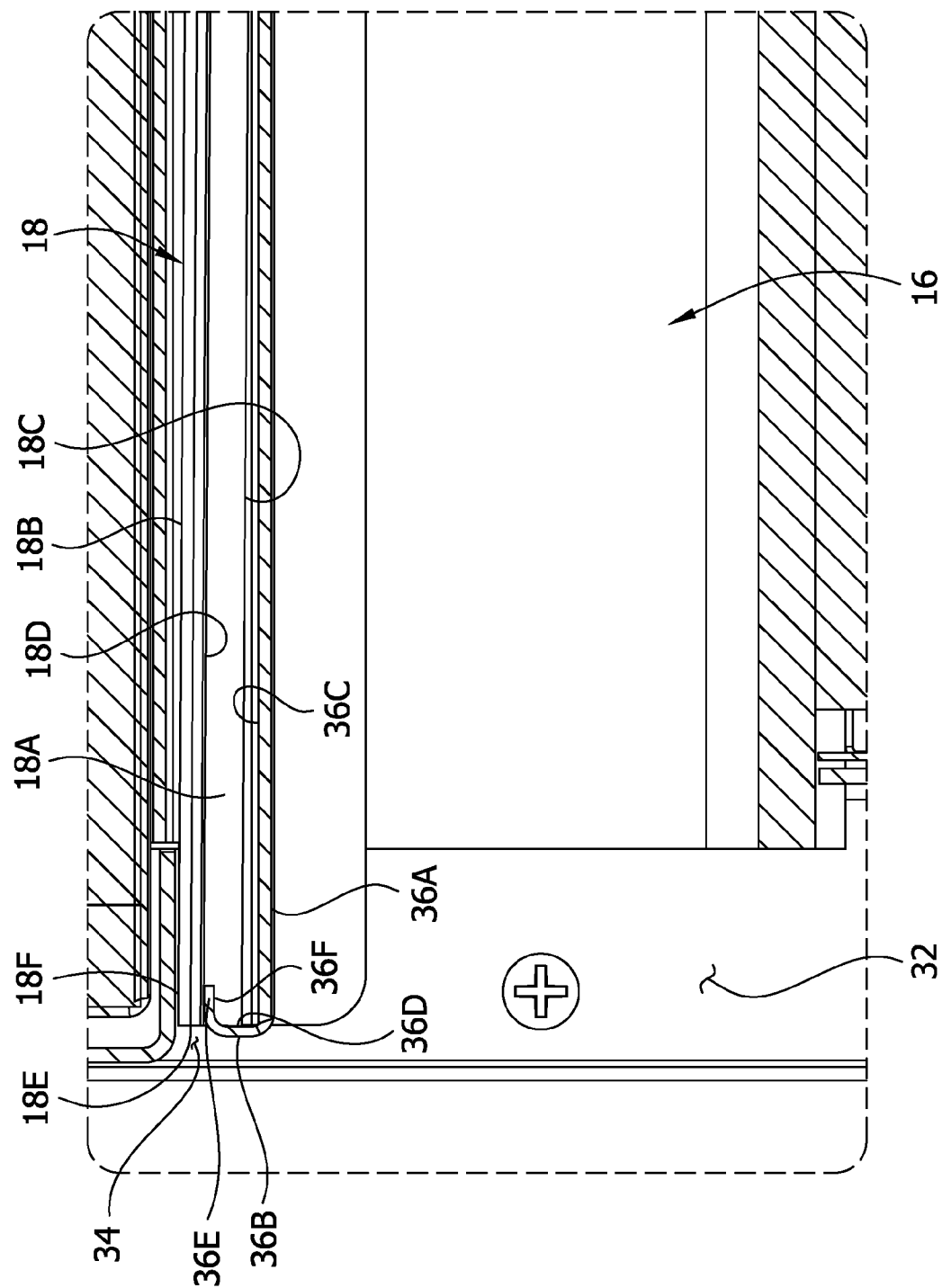
FIG. 11 is a partial side section of the portion of the pan storage apparatus of FIG. 10.
Figure 12:
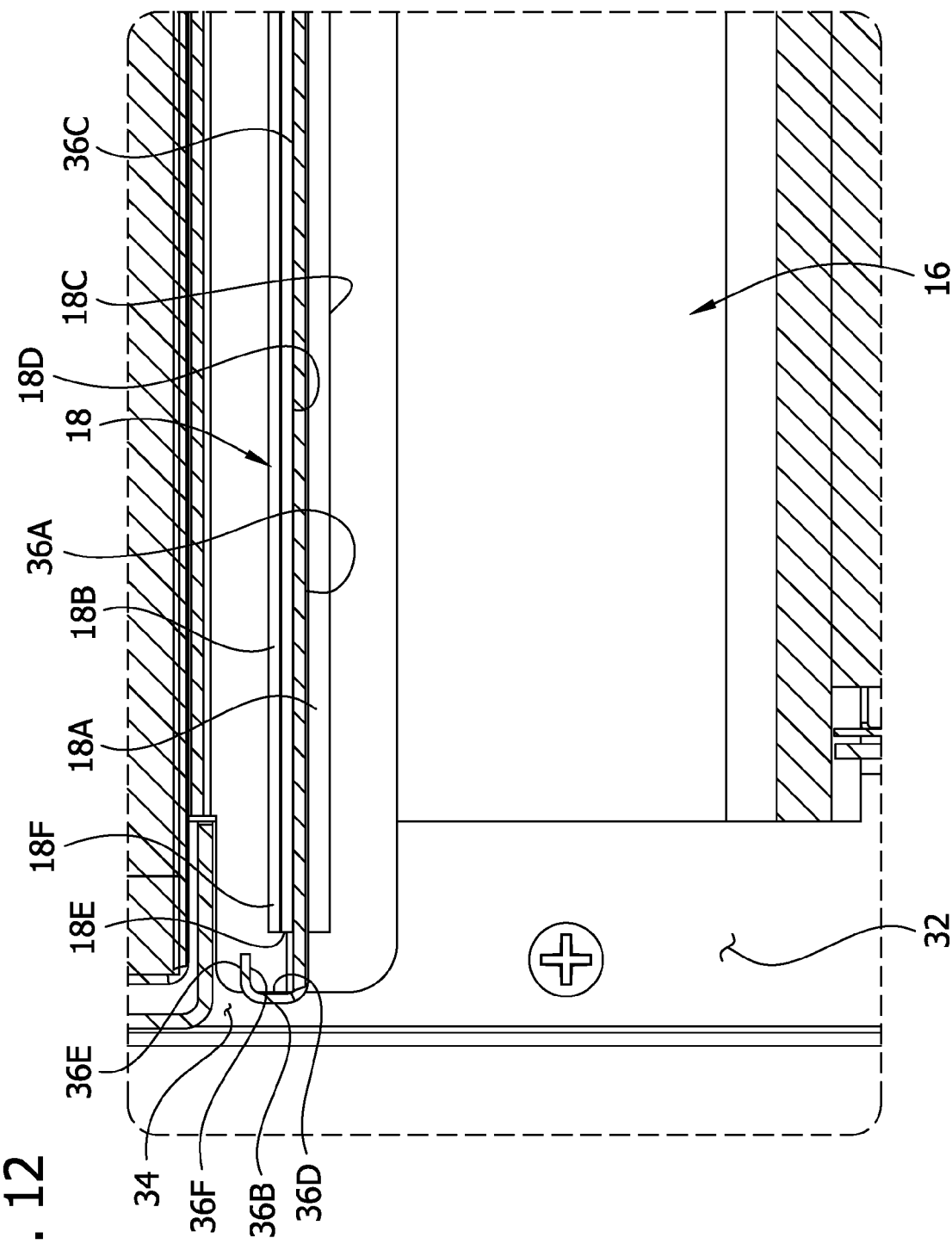
FIG. 12 is a view similar to FIG. 11 but showing the cover received in the pan storage space.

As will become apparent, the cover supports 36A and the cover retainers 36B are constructed to permit the cover 18 to be selectively received in and removed from the pan storage space 16 and to retain the cover in the pan storage space for preventing inadvertent removal of the cover from the pan storage space. Referring to FIGS. 7 and 8, left and right cover retainers 36B are provided adjacent the front opening. The front cover retainers 36B will be discussed in further detail, with the understanding the rear cover retainers have essentially the same configuration. The front cover retainers 36B include respective rearward facing cover retaining surfaces 36D (FIG. 11). The cover retaining surfaces 36D are constructed and positioned for engaging the retainer engagement surfaces 18E of the cover 18 when the cover is in the pan storage space 16 for retaining the cover in the pan storage space. As shown in FIG. 7, the left and right retainers 36B block upper forward portions of the pan storage space 16. In the illustrated embodiment, the cover retaining surfaces 36D are located inside the pan storage space 16 adjacent the front end of the pan storage space. The retainers 36B are immovable or fixed in position with respect to the cover supports 36A. The cover retaining surfaces 36D are positioned higher than and extend above or upward from the cover support surfaces 36C. As will become apparent, the cover retaining surfaces 36D are positioned to be in horizontal registration with the retainer engagement surfaces 18E of the cover 18 (i.e., the cover is in a retained position) when the cover rests on the cover supports 36A and when the pan 12 supports the cover off the cover supports.

The cover retainers 36B also include respective keepers 36E for retaining the cover 18 in the retained position by limiting upward movement of the retainer engagement surfaces 18E with respect to the cover retaining surfaces 36D. The keepers 36E include cover keeping surfaces 36F behind and extending rearward from the respective cover retaining surfaces 36D above and facing downward toward the cover support surfaces 36C for engagement with upper keeper engagement surfaces 18F of the cover 18 on the arms 18B of the cover adjacent the front end of the cover.

As is now apparent, the cover receiving opening 34 includes a central portion extending between the left and right cover holders 36 sized for receiving the pan covering section 18A and left and right portions above the cover retainers 36B sized for receiving the arms 18B. The left and right portions of the cover receiving opening 34 define respective gaps above the cover retainers 36B and below the top wall 20D to permit the arms to be moved into and out of the pan storage space without moving the cover retainers.

It will be appreciated that the rear cover retainers 36B have a similar construction. In the illustrated embodiment, the cover supports 36A and the cover retainers 36B, including the keepers 36E, are formed as one piece of metal and are immovable with respect to each other, but other configurations can be used without departing from the scope of the present invention.

Figure 10:
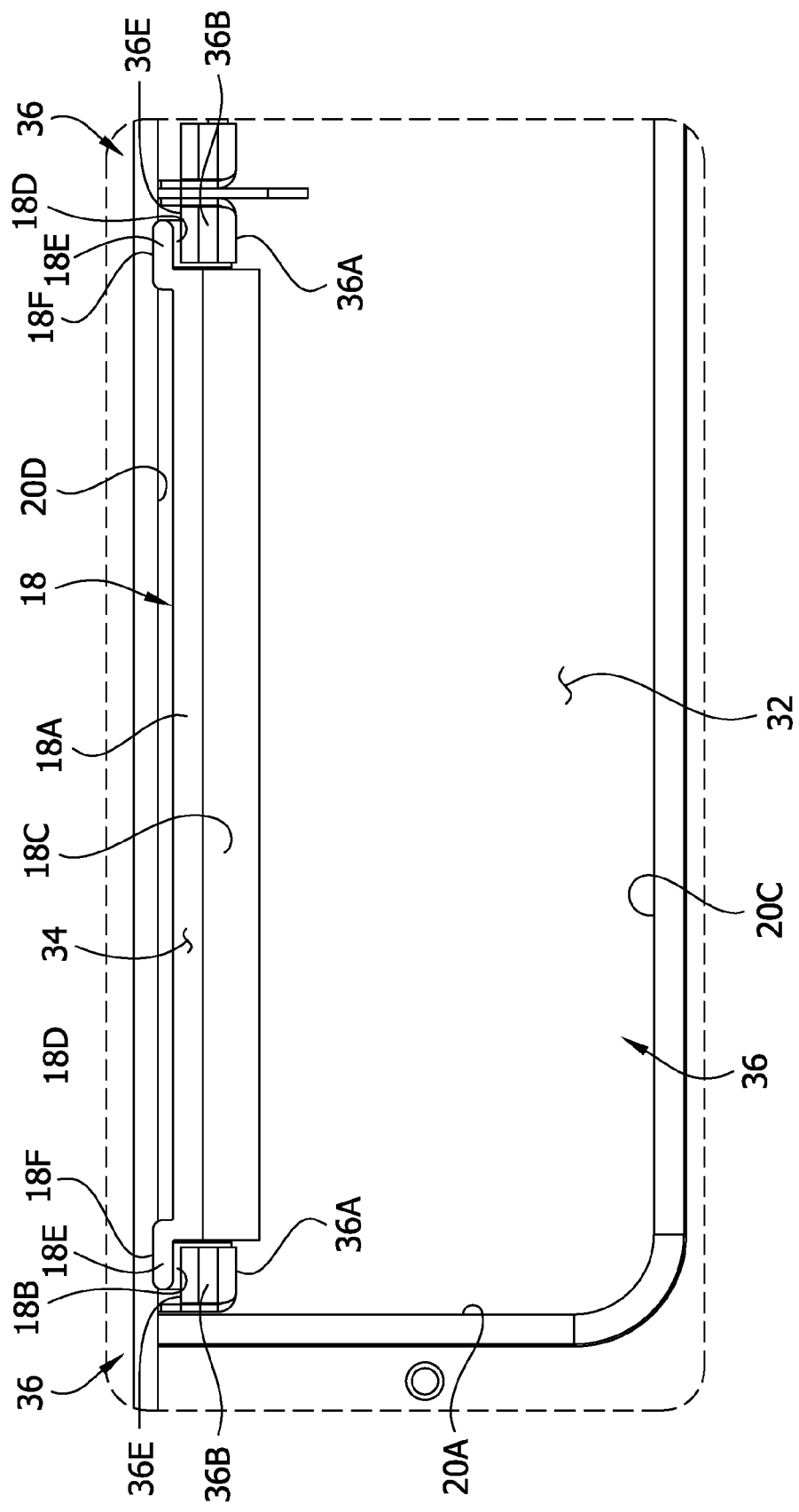
FIG. 10 is a front elevation of the portion of the pan storage apparatus of FIG. 7 but omitting the pan and showing the cover partially received in the pan storage space.

An example method of manipulating the pan 12 and cover 18 will now be described with reference to FIGS. 10-14. FIGS. 10 and 11 illustrate the pan storage space 16 having the cover 18 partially received therein and not having the pan 12 received therein. It will be understood that the cover 18 can be received in the pan storage space 16 by inserting the rear end of the cover in the cover receiving opening 34 and pushing the cover rearward until the front end of the cover is received in the pan storage space. The cover retainers 36B are positioned and the cover receiving opening 34 is sized and shaped such that the cover 18 can be passed into the pan storage space 16 without moving the cover retainers 36B. The arms 18B of the cover 18 pass above the retainers 36B, and the pan covering section 18A passes between the retainers. FIGS. 10 and 11 illustrate the cover 18 almost moved to its retained position in the pan storage space 16. The support engagement surfaces 18D adjacent the rear end of the cover 18 may rest on and slide along the cover support surfaces 36C as the cover is pushed into the pan storage area 16. In FIGS. 10 and 11, the support engagement surfaces 18D adjacent the front end of the cover 18 are shown resting on the keepers 36E. The retainer engagement surfaces 18E are shown above the cover retaining surfaces 36D as the retainer engagement surfaces pass over the cover retaining surfaces. After the retainer engagement surfaces 18E pass the keepers 36E, as shown by comparison of FIGS. 11 and 12, the front end of the cover 18 falls downward such that the retainer engagement surfaces 18E fall into horizontal registration with the cover retaining surfaces 36D, and the keeper engagement surfaces 18F are lower than the cover keeping surfaces 36F of the keepers 36E. The support engagement surfaces 18D rest in flatwise engagement with the cover support surfaces 36C, and the pan covering section 18A is suspended by the engagement in a generally horizontal orientation in the pan storage space 16. The pan engagement surface 18C is offset below the cover supports 36A to facilitate engagement of the pan 12 with the pan engagement surface without the pan engaging the cover support structure. Accordingly, the cover 18 can be moved into the pan storage space 18 from the cover receiving opening 34 and into the retained position with respect to the retainers 36B without the retainers being moved.

Figure 13:
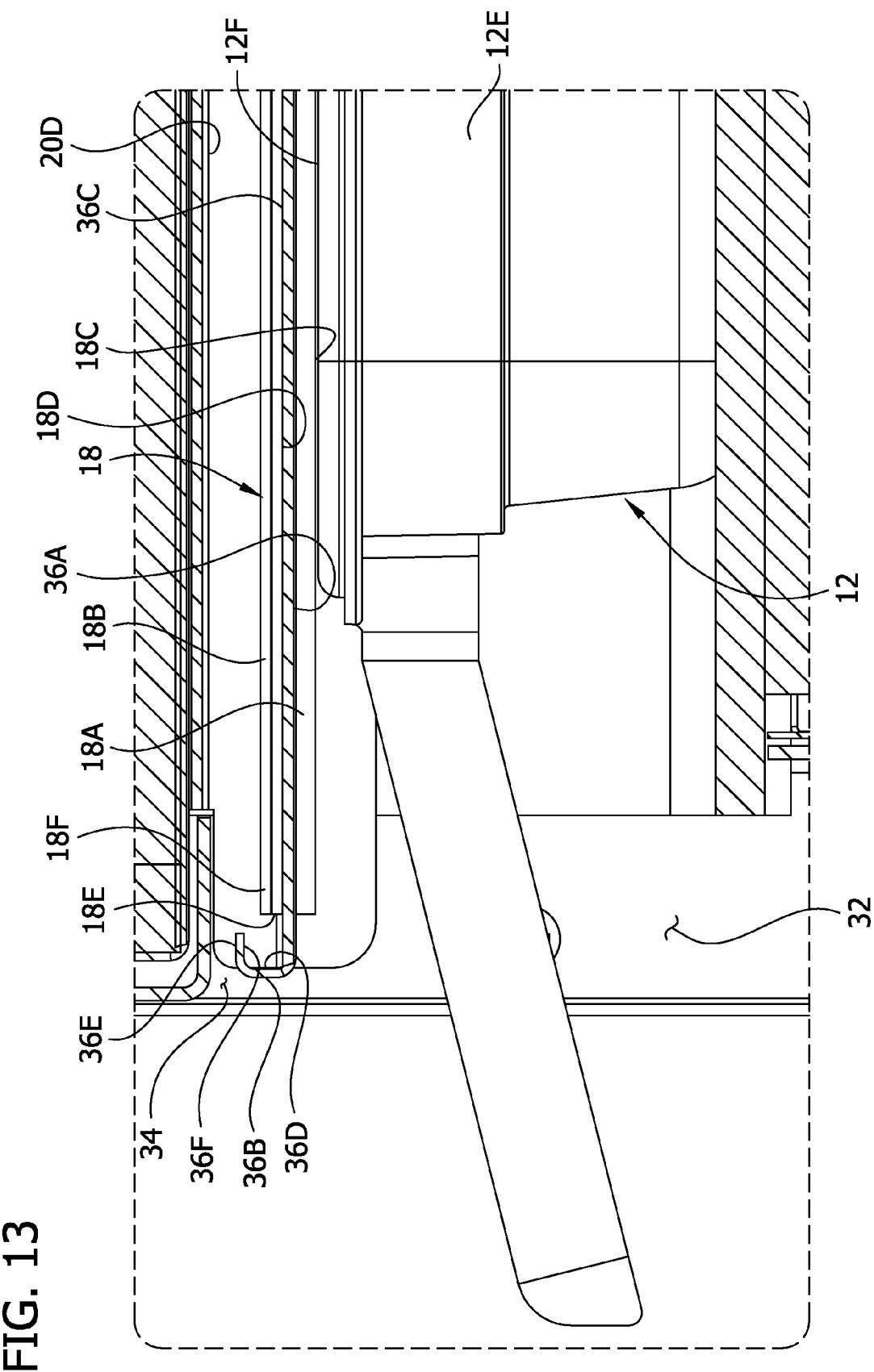
FIG. 13 is a view similar to FIG. 12 but showing the pan in the pan storage space.
Figure 14:
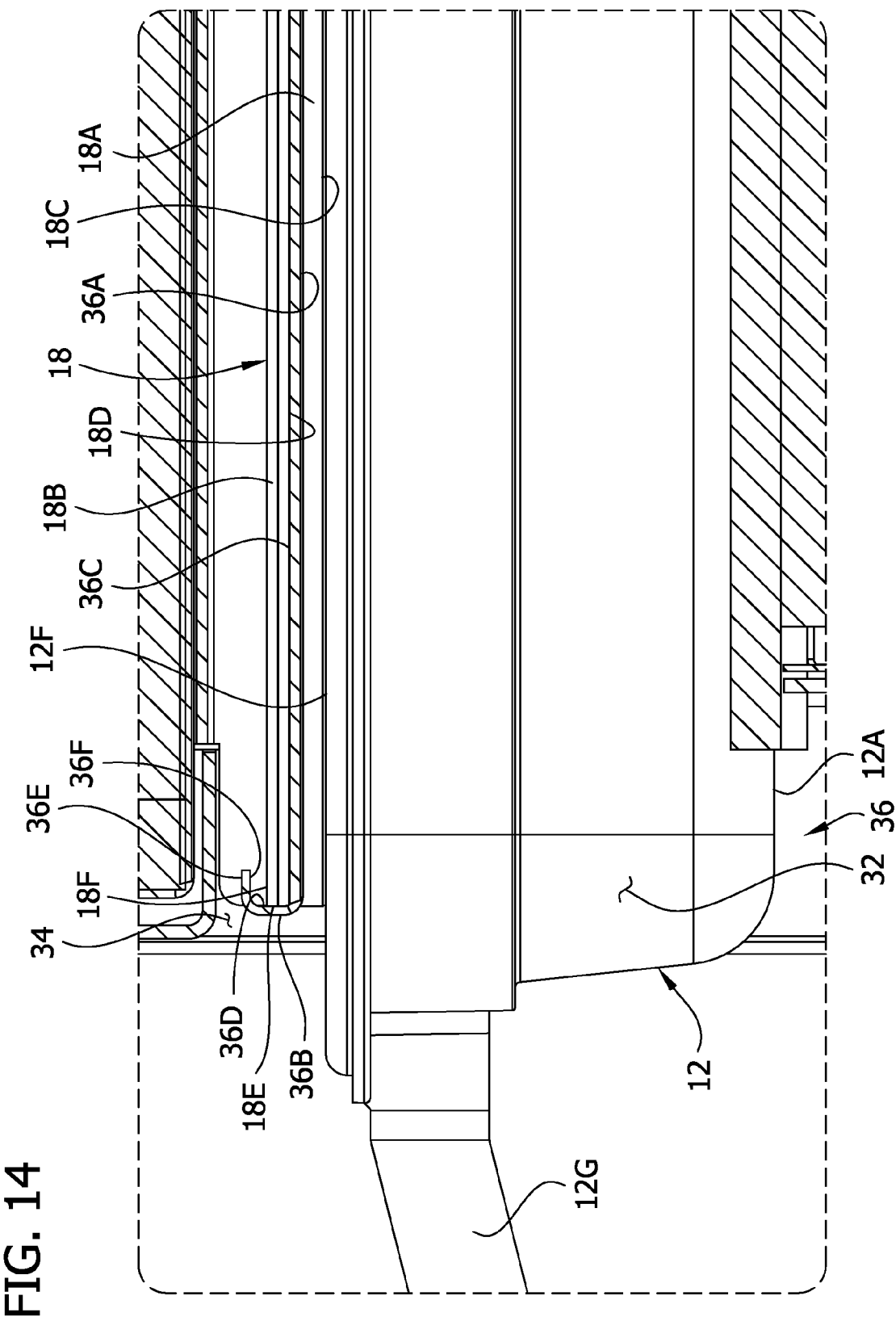
FIG. 14 is a view similar to FIG. 13 but showing the pan partially removed from the pan storage space.

To store the pan 12 in the pan storage space 16, the pan can be inserted into the pan storage space by moving the pan through the pan receiving opening 32 and sliding it along the slide surface 20C. In the illustrated embodiment, the rim 12F of the pan 12 slides along the pan engagement surface 18C of the cover 18. As the pan 12 is received in the pan storage space 16, as shown in FIG. 13, the pan lifts the cover 18 upward such that the support engagement surfaces 18D become supported by the pan 12 spaced above and out of engagement with the cover support surfaces 36C. The cover support surfaces 36C are located with respect to the slide surface 20C so that the height of the pan 12 is greater than the vertical distance between the cover support surface and the slide surface so the pan lifts the cover 18 off the cover support surfaces. Desirably, when the pan 12 reaches its stowed position in the pan storage space 16, the cover 18 covers the open top of the pan and substantially seals around the rim 12F. In the illustrated embodiment, the cover 18 is biased against the rim 12F by gravity only, but biasing devices such as springs, clamps, etc. may be used without departing from the scope of the present invention. As shown in FIG. 13, when the pan 12 supports the cover 18 off the cover support surfaces 36C, the retainer engagement surfaces 18E are still in horizontal registration with the cover retaining surfaces 36D (i.e., the cover is still in the retained position) for retaining the cover in the pan storage space 16.

When it is desired to move the pan 12 from its stowed position in the pan storage space 16 to supply contents to or remove contents from the pan, the pan can be slid at least partially out of the pan storage space by grasping the handle 12G and sliding the pan forward. The front end of the open top of the pan 12 becomes uncovered as the pan is pulled forward, exposing the contents in the pan. As shown by comparison of FIGS. 13 and 14, the cover 18 may ride forward on the pan until the cover retaining surface 36D of the retainers 36B engage the retainer engagement surfaces 18E of the cover 18 for stopping forward movement of the cover. Accordingly, the retainers 36B retain the cover in the pan storage space 16. When the retainer engagement surfaces 18E engage the cover retaining surfaces 36D, the keepers 36E overlie the keeper engagement surfaces 18F of the cover. If the front end of the cover 18 were to inadvertently move upward, the keeper engagement surfaces 18F will engage the cover keeping surfaces 36F to limit upward movement of the retainer engagement surface 18E with respect to the cover retaining surface 36D. Accordingly, the keepers 36E assist in maintaining the cover 18 in the retained position. As more of the pan 12 is moved out of the pan storage space 16 the rear end of the cover 18 may fall down such that rear ends of the support engagement surfaces 18D fall into engagement with the cover support surfaces 36C. If the pan 12 is entirely removed from the pan storage space 16, the support engagement surfaces 18D will come to rest in flush engagement with the cover support surfaces 36C along the full length of the support engagement surfaces 18D. If desired to remove the cover 18 from the pan storage space 16 (e.g., for cleaning or replacement), the cover can be moved rearward (if necessary) so to so the keeper engagement surfaces 18F are rearward from the cover keeping surfaces 36F, and the cover can be lifted up off the cover support surfaces 36C and raised such that at least the front retainer engagement surfaces 18E are out of horizontal registration with and above the front cover retaining surfaces 36D. This can be referred to as a non-retained position of the cover 18. From the non-retained position, the cover 18 can be moved forward out of the pan storage space 16 through the cover receiving opening 34, much like shown in FIGS. 10 and 11.

Figure 15:
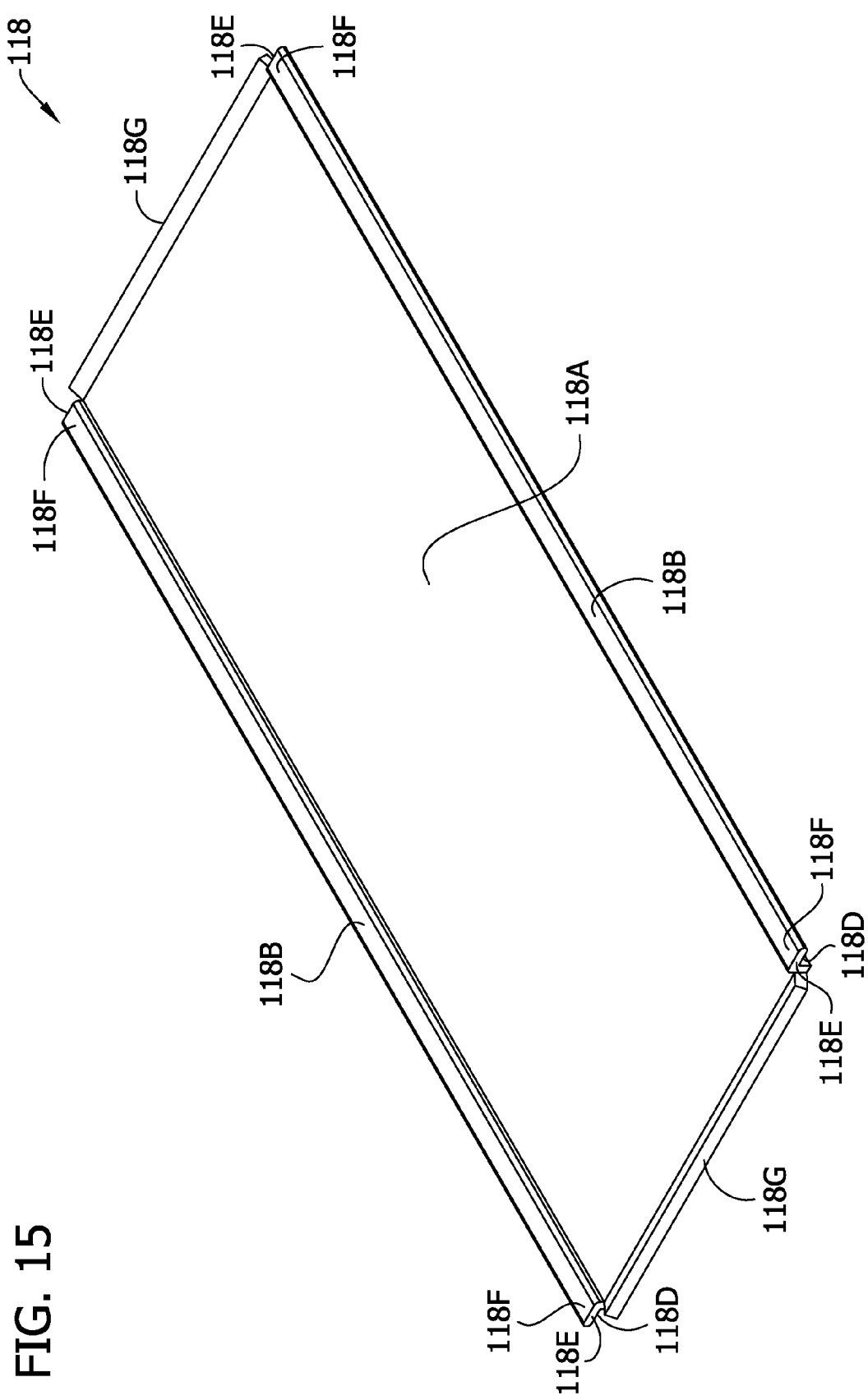
FIG. 15 is a perspective of a second embodiment of a pan cover embodying aspects of the present invention.
Figure 16:
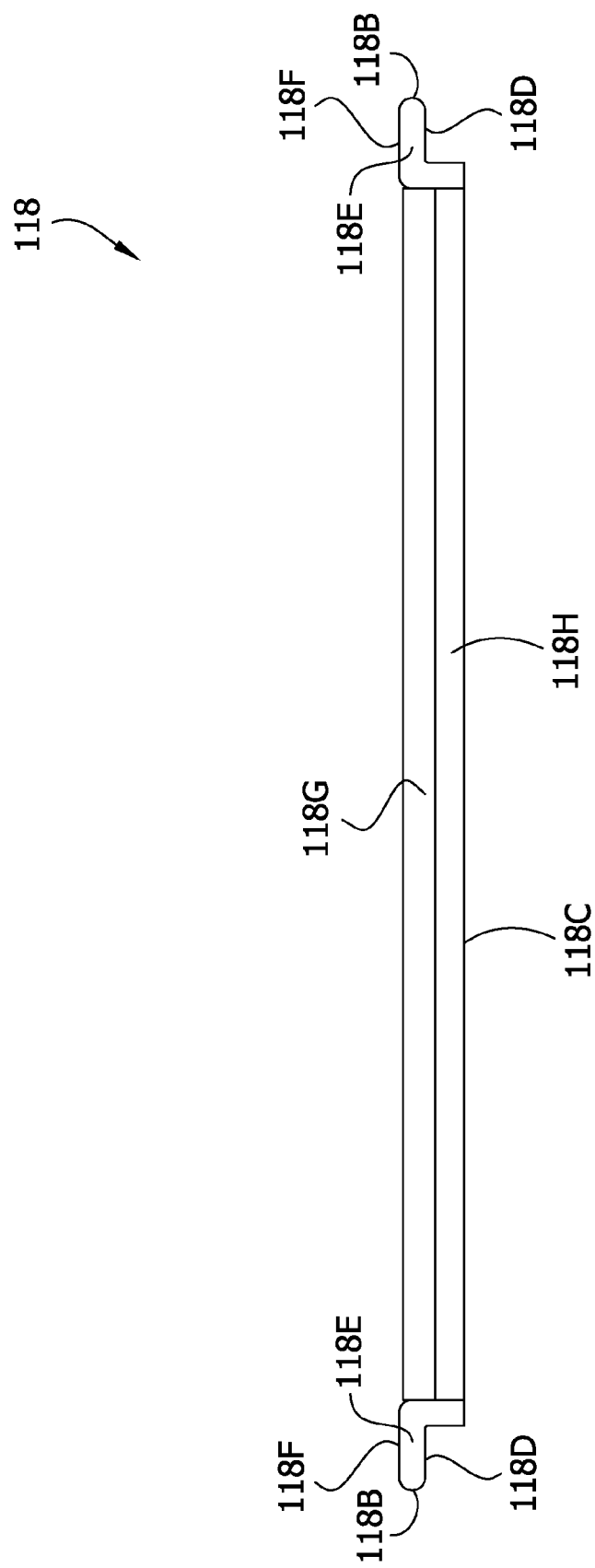
FIG. 16 is a front elevation of the pan cover of FIG. 15.

Referring to FIGS. 15 and 16, a second embodiment of a cover of the present invention is generally designated by the reference number 118. The cover 118 of this embodiment is similar to the cover 18 of the first embodiment, and like parts are designated with like reference numbers, plus 100. For example, the cover 118 includes a pan covering section 118A, arms 118B, a pan engagement surface 118C, support engagement surfaces 118D, retainer engagement surfaces 118E, and keeper engagement surfaces 118F. In this embodiment, the cover also includes front and rear cams 118G having respective cam surfaces 118H extending upwardly from the pan engagement surface 118C for engaging a front of the pan rim 12F as the pan is inserted into the pans storage space 36. It will be appreciated the cover 118 of this embodiment can be used in place of the cover 18 as part of the pan storage apparatus 10 described above in essentially the same manner as explained above, except the inclined cam surfaces 118H facilitate insertion of the pan 12 into the pan storage space 16 under the cover 118.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawing[s] shall be interpreted as illustrative and not in a limiting sense.

What is claimed is:

1. Apparatus adapted for storing food in an open top pan, the apparatus comprising,
   a pan storage space having a front pan receiving opening sized to permit the pan to be received in the pan storage space from the front pan receiving opening,
   at least one slide surface in the pan storage space constructed to slidably receive and support the pan on the at least one slide surface,
   a cover for at least partially covering the open top of the pan, the cover having a front end, a rear end, and left and right sides, the pan storage space including a front cover receiving opening at least partially above the front pan receiving opening, the front cover receiving opening being sized to permit the cover to be received in the pan storage space from the front cover receiving opening, at least one cover support surface positioned for supporting the cover in the pan storage space when the cover is received in the pan storage space from the front cover receiving opening, at least one retainer blocking a forward portion of the pan storage space, the at least one retainer including a cover retaining surface constructed for engaging a retainer engagement surface of the cover to retain the cover in the pan storage space, the cover and the at least one retainer being constructed to permit the retainer engagement surface of the cover to pass over the cover retaining surface as the cover is moved rearward with respect to the retainer into the pan storage space from the front cover receiving opening.

2. Apparatus as set forth in claim 1 wherein the front cover receiving opening includes a gap between a top of the pan storage space and the cover retaining surface sized to permit the cover to be moved rearward through the gap into the pan storage space.

3. Apparatus as set forth in claim 1 wherein the at least one cover support surface is configured for permitting the retainer engagement surface of the cover to fall downward into horizontal registration with the cover retaining surface when the cover is received in the pan storage space.

4. Apparatus as set forth in claim 1 wherein the cover is configured to be in a non-retained position in the pan storage space in which the retainer engagement surface of the cover is higher than the cover retaining surface, and the cover is configured to be in a retained position in the pan storage space in which the retainer engagement surface of the cover is in horizontal registration with the cover retaining surface.

5. Apparatus as set forth in claim 4 wherein the at least one retainer includes a keeper constructed to retain the cover in the retained position.

6. Apparatus as set forth in claim 5 wherein the keeper is configured for limiting upward movement of the retainer engagement surface with respect to the cover retaining surface.

7. Apparatus as set forth in claim 1 wherein the at least one retainer is immovable with respect to the at least one slide surface.

8. Apparatus as set forth in claim 1 wherein the at least one cover support surface is positioned with respect to the at least one slide surface such that the pan supports the cover spaced above the at least one cover support surface when the pan is received in the pan storage space on the at least one slide surface.

9. Apparatus as set forth in claim 1 wherein the cover is selectively receivable in and removable from the pan storage space from the front cover receiving opening without the at least one retainer being moved.

10. Apparatus as set forth in claim 1 wherein the at least one cover support surface comprises a left cover support surface and a right cover support surface for supporting the respective left and right sides of the cover.

11. Apparatus as set forth in claim 10 wherein the cover includes left and right support engagement surfaces for engaging the respective left and right cover support surfaces, the cover including a pan covering section between the left and right support engagement surfaces, the pan covering section including a pan engagement surface offset below the left and right support engagement surfaces.

12. Apparatus as set forth in claim 1 wherein the retainer engagement surface is located adjacent the front end of the cover.

13. Apparatus as set forth in claim 1 wherein the cover retaining surface extends upward and faces in a rearward direction, and the retainer further includes a keeper including a cover keeping surface extending rearward from the cover retaining surface above the cover retaining surface.

14. Apparatus as set forth in claim 1 in combination with the pan, wherein the pan has a height dimensioned such that the pan supports the cover spaced above the at least one cover support surface when the pan is received in the pan storage space on the at least one slide surface.

15. Apparatus as set forth in claim 1 wherein the apparatus is for holding food in the pan at a warm temperature, the apparatus comprising a heater arranged to heat food in the pan when the pan is in the pan storage space.

* * * * *